UNITED STATES PATENT OFFICE.

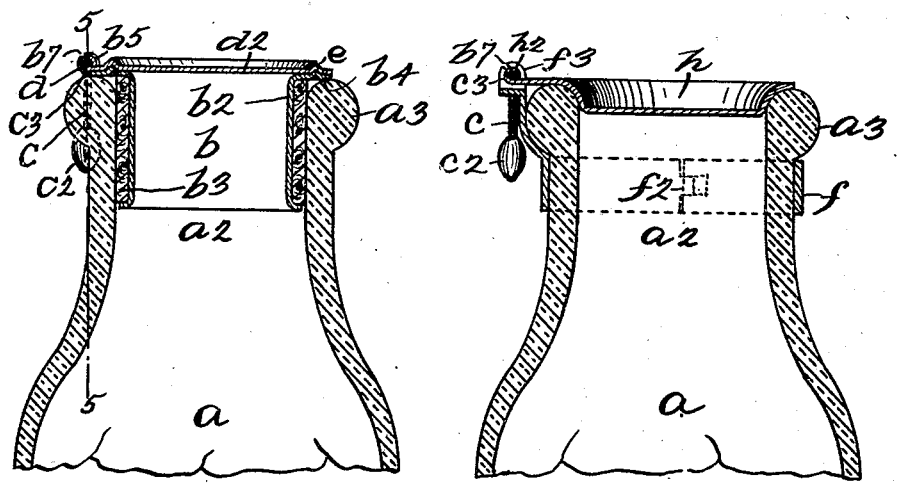
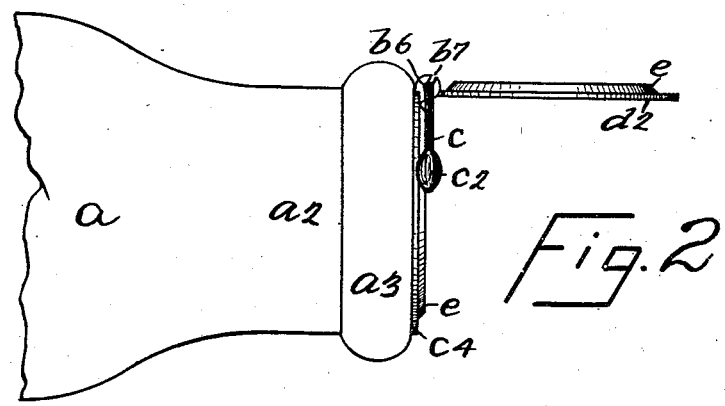
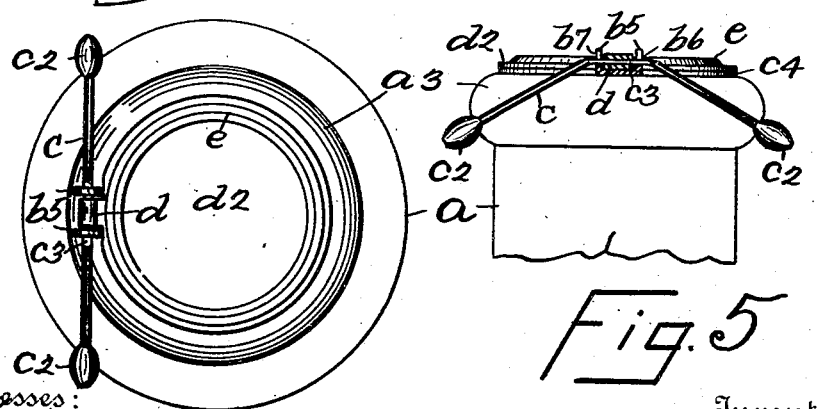

PHILIP DOERSCH, OF NYACK, NEW YORK.

BOTTLE-CLOSURE.

No. 869,963.      Specification of Letters Patent.      Patented Nov. 5, 1907.

Application filed May 1, 1907. Serial No. 371,326.

*To all whom it may concern:*

Be it known that I, PHILIP DOERSCH, a citizen of the United States of America, and residing at Nyack, in the county of Rockland and State of New York, have invented certain new and useful Improvements in Bottle-Closures, of which the following is a specification, such as will enable those skilled in the art to which it appertains to make and use the same.

This invention relates to closure devices for bottles, jars, pitchers and other vessels for holding liquids and the object thereof is to provide a gravity closure which automatically closes said vessel when in normal position and which opens and permits liquids to pass from said vessel when the latter is inclined; a still further object being to provide such a device which is readily attachable to and removable from bottles or other vessels of a stock size as for instance milk, cream, whisky and similar bottles and also to produce such a device which is simple in construction and operation, is readily taken apart for cleansing, cannot readily get out of order and is very inexpensive.

My invention is fully described in the following specification, of which the accompanying drawings form a part, in which the several parts are designated by the same reference characters in each of the views, and in which:

Figure 1 is a vertical section taken through a milk or cream bottle provided with one form of embodiment of my invention; Fig. 2 is a side view thereof but showing the bottle in position for pouring liquid therefrom; Fig. 3 is a view similar to Fig. 1 but showing a modification thereof; Fig. 4 is a plan view of Fig. 1; and Fig. 5 is a section through the attachment taken on the line 5—5 of Fig. 1 but showing the bottle in full lines.

In the drawings forming a part of this application, I have shown a milk or cream bottle $a$ provided with the usual contracted neck $a^2$ and bead $a^3$ externally of the top thereof, and, in the form shown in Figs. 1, 2, 4 and 5, I provide a plug $b$ composed of a metal tube $b^2$ and a cork, wood, or paper tube $b^3$, and the top of the metal tube $b^2$ is bent outwardly so as to rest upon the top of the bottle $a$ and this rim $b^4$ is provided with two vertical lugs $b^5$ each of which is provided with central holes or openings $b^6$ and inclined slots $b^7$ in communication therewith and it will be observed that the slots $b^7$ are of lesser diameter than the holes $b^6$ and the reason for which will be hereinafter explained.

Journaled in the holes $b^6$ is a wire or shaft $c$ which is bent downwardly on each side of the lugs $b^5$ and provided with weights $c^2$ and the shaft $c$ is flattened between the downwardly bent portions so as to slide through the slots $b^7$ when the shaft $c$ is in the necessary position but the shaft will not be removable from the lugs $b^5$ when in any other position although the size of the holes $b^6$ permit ready rotation thereof.

Firmly secured to the flattened portion $c^3$ of the shaft $c$ is a tongue $d$ of the cover $d^2$ and, in practice, the cover $d^2$ and the plate or rim $b^4$ are provided with registering ridges $e$ to insure a substantially air-tight closure and by means of the permanent connection of the cover $d^2$ and shaft $c$ it will be seen that when the said shaft is rotated in its bearings the cover is moved correspondingly and if the bottle $a$ be inclined in the proper direction the weights $c^2$ maintain the cover $d^2$ in a horizontal position, away from the neck $a^2$, and the liquid is free to pass out of the bottle and when the bottle is returned to its upright position the cover $d^2$ is immediately closed.

In Fig. 3 of the drawings I have shown a modification of the form described in that I employ a metal band $f$ externally of the bottle $a$ beneath the bead $a^3$ and this band $f$ is preferably made detachable by means of any desired connection of its ends as indicated at $f^2$ and is provided with two vertical lugs $f^3$ in all respects similar to the lugs $b^5$ but in this form of construction the cover $h$ rests directly upon the bottle neck and is secured to the shaft $c$ by means of a tongue $h^2$ and the operation of this form is similar in all respects to that already described.

If desired, the lugs $b^5$, or equivalents thereof, may be formed directly upon and integral with the bottle $a$ in which event the cover $h$ and shaft $c$ together with the weights $c^2$ are all that is necessary to make the desired closure and the said cover, with its gravity operating devices, may be readily adapted to milk and syrup pitchers or vessels of any kind or class which it is desired to cover to prevent flies, dirt or other foreign matter entering thereinto and suitable catches may be provided to secure the cover in a closed position for shipment and, when so used a cork, rubber or paper anti-leaking ring may be employed between the bottle and the cover and various other changes in and modifications of the forms of construction shown and described may be made without departing from the spirit of my invention or sacrificing its advantages.

Having fully described my invention, what I claim as new and desire to secure by Letters Patent, is:—

1. A device of the class described, comprising a vessel, a cover therefor, lugs provided with slots mounted on said vessel, a shaft secured to said cover and rotatable in said slots, said shaft being flattened at its bearing points to permit the insertion thereof into said slots and said slots being terminated in enlarged recesses.

2. A device of the class described, comprising a vessel, a cover therefor, lugs mounted on said vessel and provided with slots terminating in enlarged recesses, a shaft in said slots and secured to said cover, said shaft being flattened to permit its insertion into said slots, and weights on said shaft below the axis thereof.

3. A device of the class described, comprising a vessel, a tubular plug in the neck thereof, lugs on said plug, a shaft rotatable in said lugs, a cover secured to said shaft and weights on said shaft below the axis thereof.

4. A device of the class described, comprising a vessel, a cover therefor, a shaft secured to said cover, lugs mounted on said vessel, said lugs serving as bearings for said shaft said lugs being recessed and said shaft being angularly formed to permit the insertion into and preventing the removal of said shaft from said lugs when in any other than one predetermined position, and means for maintaining said shaft and cover in a horizontal position when the vessel is moved out of vertical position.

5. A device of the class described, comprising a vessel, a cover therefor, a shaft secured to said cover, lugs mounted on said vessel and serving as bearings for said shaft, said lugs being recessed and said shaft angularly formed, thereby permitting the insertion into and removal from said lugs, of said shaft, when in a predetermined relative position.

In testimony that I claim the foregoing as my invention I have signed my name in presence of the subscribing witnesses this 29th day of April 1907.

PHILIP DOERSCH.

Witnesses:
J. B. FESLER,
ADAM BEE.